(12) United States Patent
Marcus

(10) Patent No.: US 8,311,681 B1
(45) Date of Patent: *Nov. 13, 2012

(54) SYSTEM AND METHOD FOR CONSERVING ENERGY RESOURCES THROUGH STORAGE AND DELIVERY OF RENEWABLE ENERGY

(75) Inventor: David Marcus, West Newton, MA (US)

(73) Assignee: General Compression, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,566

(22) Filed: Mar. 9, 2012

Related U.S. Application Data

(63) Continuation of application No. 13/372,238, filed on Feb. 13, 2012.

(60) Provisional application No. 61/588,461, filed on Jan. 19, 2012.

(51) Int. Cl.
*G06F 19/00* (2006.01)
(52) U.S. Cl. ......... 700/295; 700/286; 700/291; 361/601
(58) Field of Classification Search ................. 700/286, 700/291, 295; 361/601
See application file for complete search history.

(56) References Cited

U.S. PATENT DOCUMENTS

| | | | |
|---|---|---|---|
| 3,844,270 A | 10/1974 | Black | |
| 4,280,853 A | 7/1981 | Palazzetti et al. | |
| 4,765,142 A | 8/1988 | Nakhamkin | |
| 5,537,822 A | 7/1996 | Shnaid et al. | |
| 5,832,728 A * | 11/1998 | Buck | 60/407 |
| 5,924,283 A | 7/1999 | Burke, Jr. | |
| 5,974,403 A | 10/1999 | Takriti et al. | |
| 6,021,402 A | 2/2000 | Takriti | |
| 6,026,349 A | 2/2000 | Heneman | |
| 6,185,483 B1 | 2/2001 | Drees | |
| 6,473,744 B1 * | 10/2002 | Tuck et al. | 705/412 |
| 6,512,966 B2 | 1/2003 | Lof et al. | |
| 6,568,186 B2 | 5/2003 | Zaleski | |
| 6,670,721 B2 | 12/2003 | Lof et al. | |

(Continued)

FOREIGN PATENT DOCUMENTS

EP 1385250 1/2004

(Continued)

OTHER PUBLICATIONS

Bathurst, et al., (2003) "Value of combining energy storage and wind in short-term energy and balancing markets", *Electric Power Systems Research*, 67(1):1-8.

(Continued)

*Primary Examiner* — Michael D Masinick

(57) ABSTRACT

A system for encouraging the use of renewable energy sources and suitable for the conservation of energy resources through the efficient management of energy storage and delivery includes connections to a power source, an energy storage subsystem, and a power grid. The system includes a power routing subsystem coupled to the source and grid, and adapted to operate in a bypass mode, in which energy is transferred from the source to the grid. The system includes a conversion subsystem coupled to the routing and storage subsystems, and switchable in substantially real-time between a storage mode, in which energy is transferred from the routing to the storage subsystem, and a generation mode, in which energy is transferred from the storage to the routing subsystem for delivery to the grid. The system also includes a controller for directing the modes based at least in part on a market factor.

19 Claims, 10 Drawing Sheets

U.S. PATENT DOCUMENTS

| | | | |
|---|---|---|---|
| 6,671,585 B2 | 12/2003 | Lof et al. | |
| 6,745,105 B1 | 6/2004 | Fairlie et al. | |
| 6,778,882 B2 | 8/2004 | Spool et al. | |
| 6,914,418 B2 | 7/2005 | Sung | |
| 7,062,460 B1 | 6/2006 | Growney et al. | |
| 7,155,912 B2 | 1/2007 | Enis et al. | |
| 7,178,337 B2 | 2/2007 | Pflanz | |
| 7,299,212 B2 | 11/2007 | Peljto | |
| 7,343,341 B2 | 3/2008 | Sandor et al. | |
| 7,373,221 B2 | 5/2008 | Lal | |
| 7,385,373 B2 | 6/2008 | Doruk et al. | |
| 7,406,364 B2 | 7/2008 | Andren et al. | |
| 7,430,534 B2 | 9/2008 | Lof et al. | |
| 7,474,995 B2 | 1/2009 | Masiello et al. | |
| 7,612,466 B2 | 11/2009 | Skutt | |
| 7,640,643 B2 | 1/2010 | Nakhamkin | |
| 7,747,739 B2 | 6/2010 | Bridges et al. | |
| 7,783,390 B2 | 8/2010 | Miller | |
| 7,791,864 B2 | 9/2010 | Matyas et al. | |
| 7,810,331 B2 | 10/2010 | Jones | |
| 7,818,270 B2 | 10/2010 | Carey et al. | |
| 7,832,207 B2 | 11/2010 | McBride et al. | |
| 7,925,552 B2 | 4/2011 | Tarbell et al. | |
| 7,930,070 B2 | 4/2011 | Imes | |
| 7,945,502 B2 | 5/2011 | Mashinsky et al. | |
| 7,949,435 B2 | 5/2011 | Pollack et al. | |
| 7,957,846 B2 | 6/2011 | Hakim et al. | |
| 8,030,791 B2 | 10/2011 | Lang et al. | |
| 8,061,132 B2 | 11/2011 | Fong et al. | |
| 8,090,479 B2 | 1/2012 | El-Gasseir et al. | |
| 8,097,980 B2 | 1/2012 | Cyrus et al. | |
| 2002/0019758 A1* | 2/2002 | Scarpelli | 705/7 |
| 2002/0084655 A1 | 7/2002 | Lof et al. | |
| 2004/0205032 A1 | 10/2004 | Routtenberg et al. | |
| 2004/0220869 A1 | 11/2004 | Perera | |
| 2005/0004858 A1 | 1/2005 | Foster et al. | |
| 2005/0125243 A1* | 6/2005 | Villalobos | 705/1 |
| 2005/0165511 A1* | 7/2005 | Fairlie | 700/286 |
| 2007/0062194 A1 | 3/2007 | Ingersoll | |
| 2007/0112579 A1 | 5/2007 | Ratnakaran et al. | |
| 2007/0158174 A1 | 7/2007 | Livneh et al. | |
| 2007/0179855 A1 | 8/2007 | Rueda et al. | |
| 2008/0091581 A1 | 4/2008 | Kremen | |
| 2008/0228518 A1 | 9/2008 | Braziel et al. | |
| 2008/0243687 A1 | 10/2008 | Johnson et al. | |
| 2008/0319893 A1 | 12/2008 | Mashinsky et al. | |
| 2009/0038668 A1 | 2/2009 | Plaisted | |
| 2009/0040029 A1* | 2/2009 | Bridges et al. | 340/310.11 |
| 2009/0070187 A1 | 3/2009 | Webster | |
| 2009/0240381 A1 | 9/2009 | Lane | |
| 2009/0265040 A1 | 10/2009 | Paluszek et al. | |
| 2009/0326726 A1 | 12/2009 | Ippolito et al. | |
| 2010/0017341 A1* | 1/2010 | Bing | 705/36 R |
| 2010/0049371 A1 | 2/2010 | Martin | |
| 2010/0057582 A1 | 3/2010 | Arfin et al. | |
| 2010/0089063 A1* | 4/2010 | McBride et al. | 60/682 |
| 2010/0101231 A1 | 4/2010 | Westmeier | |
| 2010/0179862 A1 | 7/2010 | Chassin et al. | |
| 2010/0217550 A1* | 8/2010 | Crabtree et al. | 702/62 |
| 2010/0332373 A1* | 12/2010 | Crabtree et al. | 705/37 |
| 2011/0041501 A1 | 2/2011 | Gerard | |
| 2011/0167814 A1 | 7/2011 | Haynes | |
| 2011/0208637 A1 | 8/2011 | Wakita et al. | |
| 2011/0232281 A1 | 9/2011 | McBride et al. | |

FOREIGN PATENT DOCUMENTS

| | | |
|---|---|---|
| EP | 2343791 | 7/2011 |
| JP | 2003002089 | 1/2003 |
| JP | 2003257458 | 9/2003 |
| JP | 2010176613 | 8/2010 |
| WO | WO-02103465 | 12/2002 |
| WO | WO-2005013055 | 2/2005 |
| WO | WO-2008124474 | 10/2008 |
| WO | WO-2011002710 | 1/2011 |
| WO | WO-2011027339 | 3/2011 |
| WO | WO-2011146162 | 11/2011 |

OTHER PUBLICATIONS

Economic Modeling of Compressed Air Energy Storage for Enhanced Grid Integration of Wind Power, http://www.eonerc.rwth-aachen.de/aw/cms/website/zielgruppen/fcn/research_fcn/research_projects/ablagestruktur/~vak/Economic_Modeling_of_Compressed_Air_Ener/?lang=de, [Retrieved from the internet on Feb. 10, 2012] (2 pages).

Energy Storage: The Missing Link in the Electricity Value Chain, http://webcache.googleusercontent.com/search?q=cache:GamUatFdEvwJ:www.energystoragecouncil.org/ESC%2520White%2520Paper%2520.pdf+electric+energy+trading+by+compreesion+energy+storage&hl=en&gl=in, [Retrieved from the internet on Feb. 10, 2012] (31 pages).

Korpas, et al., (2002) "Operation and Sizing of Energy Storage for Wind Power Plants in a Market System", *14th PSCC*, 31:6, (7 pages).

Korpas, M., (2004) "Distributed Energy Systems with Wind Power and Energy Storage", *Norwegian University of Science and Technology*, (217 pages).

Márquez, et al., Combining hydro-generation and wind energy Biddings and operation on electricity spot markets, *Universidad Carlos III de Madrid*, (8 pages), 2006.

Matevosyan, et al., "Short Term Hydro Power Planning Coordinated with Wind Power in Areas with Congestion Problems", *Royal Institute of Technology*, (11 pages), 2006.

Matevosyan, et al., (2009) "Hydropower planning coordinated with wind power in areas with congestion problems for trading on the spot and the regulating market", *Electric Power Systems Research*, pp. 39-48.

Morales, et al., (2010) "Short-Term Trading for a Wind Power Producer", *IEEE*, 25(1):554-564.

Morikiyo, et al. (2004) "Artificial Trading for US Wholesale Electric Power Market", *Asia Pacific Management Review*, 9(5):751-781.

Pousinho, et al., (2011) "A risk-averse optimization model for trading wind energy in a market environment under uncertainty", *Energy*, 36:4935-4942.

Raineri, et al., (2006) "Technical and economic aspects of ancillary services markets in the electric power industry: an international comparison", *Energy Policy*, 34:1540-1555.

Space Solar Power Institute—Frequently Asked Questions, http://solarsat.org/faq.htm, [Retrieved from the internet on Feb. 10, 2012] (13 pages).

Zugno, et al., (2010) "Trading Wind Energy in a Liberalised Market Environment: a Real-world Test Case in Eastern Denmark", *DTU*, abstract (1 page).

\* cited by examiner

| Technical Parameter | Min Value or Range | Max Value or Range | Typical Value(s) or Ranges |
|---|---|---|---|
| Output of power source (e.g., wind farm) | 1.5MW | 2000MW | 100MW |
| Cavern capacity (volume of gas) | 20 kcf | 4 bcf | 1 bcf |
| Pressure of stored gas | ~20 Bar | 200 Bar | 70-95 Bar FEP |
| GCAES compression rate (gas) | 5 Bar | 200 Bar | First Stage 1-7 Bar<br>Second Stage 7-90 Bar |
| GCAES expansion rate (energy) | 5 Bar | 200 Bar | First Stage 7-90 Bar<br>Second Stage 1-7 Bar |
| GCAES generation-to-storage mode switch time | 50ms. | <=4.2sec | .25sec to <= 4.2sec |
| GCAES storage-to-generation mode switch time | 50ms. | <=4.2sec | .25sec to <=4.2sec |
| GCAES idle-to-expansion time | 50ms. | <=4.2sec | .25sec to <=4.2sec |
| GCAES idle-to-compression time | 50ms. | <=4.2sec | .25sec to <=4.2sec |

FIG. 2

| Table 1 – Baseline Energy Balance Case (No Trading) | | | |
|---|---|---|---|
| Power Source (MW) | GCAES (MW) | → | Grid (MW) |
| 200 (high wind) | -100 | → | 100 |
| 100 (average wind) | 0 | → | 100 |
| 0 (no wind) | 100 | → | 100 |

FIG. 3A

| Table 2 – High Price / Available Supply Case (Selling / Expanding) | | | |
|---|---|---|---|
| Power Source (MW) | GCAES (MW) | → | Grid (MW) |
| 200 (high wind) | 100 | → | 300 |
| 100 (average wind) | 100 | → | 200 |
| 0 (no wind) | 100 | → | 100 |

FIG. 3B

| Table 3 – Low Price / Available Capacity Case (Buying / Compressing) | | | |
|---|---|---|---|
| Power Source (MW) | GCAES (MW) | → | Grid (MW) |
| 200 (high wind) | -100 | → | 100 |
| 100 (average wind) | -100 | → | 100 |
| 0 (no wind) | -100 | → | 100 |

FIG. 3C

Baseline Case

Storage Approaching Full

Storage Approaching Empty

| Example Fixed-Band Trading Parameters |
|---|
| Average market price of energy |
| Predetermined margin around an energy price above which energy will be sold |
| Predetermined margin around an energy price below which energy will be purchased |
| Amount of available storage capacity that will result in the margins shifted up (less buying, more selling) |
|   Amount buy margin is shifted up |
|   Amount sell margin is shifted up |
| Amount of available storage that will result in the margins shifted down (more buying, less selling) |
|   Amount buy margin is shifted down |
|   Amount sell margin is shifted down |
| Energy sold per trading interval (time unit) (full capacity) |
| Length of trading interval (time unit) |

FIG. 5

| Example Predictive Trading Parameters |
| --- |
| Base load contract price |
| Market price of energy/electricity (present) |
| Market price of energy/electricity (future) |
| Supply of electricity |
| Demand of electricity |
| *Environmental Conditions* |
|   Wind speed |
|   Wind direction |
|   Air temperature |
|   Air pressure |
|   Humidity |
|   Precipitation |
|   Cloud cover |
|   Season |
|   Length of daylight |
|   Tidal status |
|   Storage temperature |
|   Storage time |
|   Storage pressure |
|   Day/night temperate differential |

FIG. 9

SYSTEM AND METHOD FOR CONSERVING ENERGY RESOURCES THROUGH STORAGE AND DELIVERY OF RENEWABLE ENERGY

CROSS-REFERENCE TO RELATED APPLICATION

This application is a continuation of and claims priority to co-pending U.S. patent application Ser. No. 13/372,238, filed Feb. 13, 2012, which claims priority to U.S. Provisional Patent Application Ser. No. 61/588,461, filed Jan. 19, 2012, the entireties of which are hereby incorporated by reference.

TECHNICAL FIELD

The invention relates generally to a system and method for managing energy storage and delivery, and more specifically to a system and method for encouraging the use of renewable energy sources and the conservation of non-renewable resources through the efficient management of energy storage and delivery.

BACKGROUND INFORMATION

Existing power generation methods typically fall into specific groups, namely: (1) baseload power delivery, which comes from generators that have technologies that enable them to economically sign contracts to sell power 24 hours a day, seven days a week, such as nuclear, coal, hydro, biomass, and some combined cycle gas; (2) intermediate power delivery, which is power delivered approximately 16 hours a day, either 5 or 7 days a week, mainly from combined cycle gas plants; (3) peaker power delivery, which is delivery of power for about eight hours a day, 5 days a week, and is roughly coincident with peak load, and which is mainly from simple and combined cycle gas plants and some diesel plants; and (4) intermittent sources which cannot be scheduled, such as wind and solar. In addition to these power generation services, there are also markets for power quality services, such as frequency regulation up, frequency regulation down, capacity, black start, ramp-rate control, spinning reserve, and non-spinning reserve.

Current technologies that are directed toward renewable energy sources mainly transform intermittent resources such as wave, wind and solar into intermittent power. Many of these renewable resources are difficult to predict and schedule. The extensive development of global wind-power has given rise to efforts to address the challenges of intermittent energy sources with respect to generating electricity for power grids. Many of these efforts involve the development of means to condition intermittent electric power sources that supply a grid, so as to minimize or counteract the disturbances that would otherwise affect the grid in undesirable ways. Other efforts involve developing energy storage means that can act to the benefit of wind farms and other intermittent sources of renewable energy. Energy storage means provide a benefit for intermittent sources by harvesting into storage so-called excess capacity during periods when electricity may be generated in excess of the current electricity demand. The electricity that might be generated, for example, by a wind farm during periods when wind energy exceeds the grid's energy consumption, might be assigned a low or negative price, or the wind farm curtailed (disconnected) from supplying energy to the grid. Similarly, in a grid significantly powered by intermittent sources, grid energy demand might go unmet during periods when energy demand is greater than the available wind energy.

One important form of power conditioning that may facilitate increased use of wind, and similarly intermittent renewable energy sources, is the development of means to transform wind energy from being an intermittent power resource to being a fully dispatchable power resource able to offer firm power contracts. Firm power contracts are contracts to deliver a specified amount of energy to a specified point during a specified time period, and require the seller to pay penalties if they cannot meet the terms of the contracts. Firm contracts command a price premium to intermittent contracts in most markets, and are therefore valuable. Efforts to transform intermittent wind into firm power have heretofore depended upon forecasting future wind velocities (for purposes of selling into the day-ahead market), and coordinating operation of the wind-power generation with other remotely sited intermittent power sources, and/or coordination with more-constant power sources, such as hydro, whose power flow rate can be varied up or down to compensate for higher or lower flow rate from a wind farm, and/or coordination with thermal generators such as simple cycle gas plants and diesel plants that can ramp up or down in response to the real-time output of wind farms. Such coordination efforts do not transform intermittent wind energy into firm power, but they do help intermittent wind to be integrated into the grid. Power generators must increasingly participate in competitive markets established to govern electric power generation/sale/trading. Therefore, the development of wind (and other intermittent renewable energy sources) in the United States (and other parts of the world) is severely impeded by its lower market value.

A means to enhance the economic value of wind and other intermittent renewable energy sources in the competitive deregulated power trading market is vital to increasing deployment of renewable energy generation. Increasing the economic value of wind is perhaps the most important long-range determinative factor for renewable energy growth in the United States. Given a federal commitment to maintain and develop competitive markets for electric power generation/sale/trading, the self-evident competitive drivers for use of renewable energy are enhanced price and reduced cost. Governmental and academic studies of the future prospects for renewable energy explicitly recognize the significance of price and cost factors in the current day competitive market.

To date, various efforts to provide energy storage to wind farms have not transformed wind-generated electric power into firm power within the pricing framework of the grid, even though the addition of storage has ameliorated to some extent the intermittent nature of wind-power. Implementations of compressed air energy storage (CAES), pumped hydro storage, battery, flywheel, thermal storage, and other storage means have been limited in this regard by technology. Existing technology has not demonstrated the ability to produce electric power outputs that are valued by the competitive grid as premium power.

Accordingly, there exists a need to provide systems and methods that transform intermittent power into firm power, such that the use of renewable energy sources is further encouraged.

SUMMARY OF THE INVENTION

The present invention achieves firm electric power by combining an intermittent power source, such as wind, with a storage means such as CAES. The present invention is designed to enable flexible, responsive generation of power well-suited to win premium prices as inputs to the electric power grid—such as base power, following power, intermediate power, peaking power, supplemental reserves, replacement reserves, spinning reserves, non-spinning reserves, black start, and frequency regulation—in a manner that is not interrupted by lack of wind or other typical intermittent factors.

The flexible nature of the system enables a controlled transformation between compressed gas energy and electrical power—in either direction (reversibly, subject to efficiency losses)—thus enabling a method of (economically) purchasing and selling electric power from/to the grid, at full market price rather than at diminished intermittent wind-power prices. The system further enables a power trading strategy based on one or more factors of current price, average past prices, future predicted prices, current state of intermittent power source, predicted future states of such intermittent power source, current state of capacity of energy storage in the CAES system, current state of utilization of electric motor-generators, current capacity of wind turbines or other intermittent power engines, system costs, transaction costs, power supply and demand, and other factors having an effect on energy pricing, storage and distribution.

Accordingly, in one aspect of the invention, a system for managing energy storage and delivery includes a connection to a power source, a connection to an energy storage subsystem, a connection to a power grid, a power routing subsystem, a conversion subsystem, and a control subsystem. The power routing subsystem is coupled to the power source and the power grid, and is adapted to operate in a bypass mode, in which energy is transferred from the power source to the power grid. The conversion subsystem is coupled to the power routing subsystem and the storage subsystem, and is switchable in substantially real-time between a storage mode, in which energy is transferred from the power routing subsystem to the storage subsystem, and a generation mode, in which energy is transferred from the storage subsystem to the power routing subsystem for delivery to the power grid. The control subsystem directs, based at least in part on a market factor, the conversion subsystem and/or the power routing subsystem to operate in a specific mode.

The power source may be an intermittent power source, which can be any of wind energy, solar energy, wave energy, tidal energy, falling water, hydro energy, biomass energy, and geothermal energy. Moreover, the intermittent power source may produce electrical power.

The storage subsystem can be of a medium such as fluidic storage, mechanical storage, kinetic storage, electrical storage, electrochemical storage, and thermal storage, and may include a storage volume which can be any of a pressure vessel, a subterranean cavern, a well, a flywheel, a battery, piping, a bladder, a hydrostatically pressure-compensated container, a lake, a pond, a liquid storage vessel, a water retention structure, and a capacitor.

In one embodiment, the system is adapted to store energy as compressed gas. The conversion system may further include a motor/generator, a hydraulic pump/motor, a hydraulic actuator, and a compressor/expander connected in one of series or parallel.

The controller may direct the modes of operation by comparing the market factor to a threshold. The mode direction may further be based at least in part on the available capacity of the storage subsystem.

In one embodiment, the controller can switch the conversion subsystem to operate in the storage mode when the market factor is less than the threshold and there exists available storage capacity, and in some cases, can switch the conversion subsystem when the market factor is less than the threshold by at least a predetermined margin. The predetermined margin may be decreased when the available capacity is greater than a predetermined value, and may be increased when the available capacity is less than a predetermined value.

In another embodiment, the controller directs the system to operate in at least one of the generation mode and the bypass mode when the market factor is greater than the threshold, and in some cases, can direct the system to operate in a mode when the market factor is greater than the threshold by at least a predetermined margin. The predetermined margin may be increased when the available capacity is greater than a predetermined value, and may be decreased when the available capacity is less than a predetermined value.

In yet another embodiment, the controller directs the mode of operation based at least in part on environmental conditions. The environmental conditions may be local environmental conditions and/or remote environmental conditions, as well as present conditions and/or projected conditions. The environmental conditions may include wind speed, wind direction, air temperature, air pressure, humidity, precipitation, cloud cover, season, length of daylight, tidal status, storage temperature, storage pressure, storage time, and day/night temperature differential.

The threshold can be, for example, a present supply, a future supply, a present demand, a future demand, an average market price, or a current market price. In some cases, the market factor may be a market price of electricity, a present market price of electricity, a future market price of electricity, a trending price of electricity, a supply of electricity, or a demand of electricity.

In one embodiment, the controller further includes a power delivery algorithm. The power delivery algorithm may be adapted to fulfill a long-duration power service simultaneously with at least one ancillary power service. The power delivery algorithm may be adapted to fulfill a power service such as baseload, intermediate, peaking, load following, frequency regulation, spinning reserve, non-spinning reserve, black start, reactive power control, load source on demand response, and/or ramp-rate control. In some embodiments, the power delivery algorithm is adapted to fulfill the power service by simultaneously operating the system in the storage mode and the bypass mode. In other embodiments, the power delivery algorithm is adapted to fulfill the power service by simultaneously operating the system in the generation mode and the bypass mode.

In further embodiments, the system includes a trading subsystem for initiating at least one of a purchase of electricity, an offer to purchase electricity, a sale of electricity, and an offer to sell electricity. The trading subsystem may be adapted to fulfill a power service by buying electricity at a market price, and selling electricity at a contract price.

In another aspect of the invention, a method for managing energy storage and delivery includes the steps of connecting to a power source, connecting to an energy storage subsystem, connecting to a power grid, routing at least some energy produced by the power source to the power grid, and automatically switching in substantially real-time between storing energy by transferring energy from at least one of the power source and the power grid to the storage subsystem, and generating energy by transferring energy from the storage subsystem to the power grid. The switching may be based at least in part on a market factor.

The power source may be an intermittent power source, which can be any of wind energy, wave energy, solar energy, tidal energy, falling water, hydro energy, biomass energy, and geothermal energy. Moreover, the intermittent power source may produce electrical power.

The storage subsystem can be of a medium such as fluidic storage, mechanical storage, kinetic storage, electrical storage, electrochemical storage, and thermal storage, and may include a storage volume which can be any of a pressure vessel, a subterranean cavern, a well, a flywheel, a battery, piping, a bladder, a hydrostatically pressure-compensated container, a lake, a pond, a liquid storage vessel, a water retention structure, and a capacitor.

In one embodiment, the routing step is performed automatically. In one embodiment, the storing step includes compressing gas.

The routing and switching steps may be based on a comparison of the market factor to a threshold. The routing and switching steps may be further based at least in part on an available capacity of the storage subsystem.

In one embodiment, the switching step further includes switching to storing energy when the market factor is less than the threshold and there exists available storage capacity, and in some cases, includes switching to storing energy when the market factor is less than the threshold by at least a predetermined margin. The predetermined margin may be decreased when the available capacity is greater than a predetermined value, and may be increased when the available capacity is less than a predetermined value.

In another embodiment, the switching step further includes switching to generating energy when the market factor is greater than the threshold, and in some cases, includes switching to generating energy when the market factor is greater than the threshold by at least a predetermined margin. The predetermined margin may be increased when the available capacity is greater than a predetermined value, and may be decreased when the available capacity is less than a predetermined value.

In yet another embodiment, the routing and switching steps are further based at least in part on environmental conditions. The environmental conditions may be local environmental conditions and/or remote environmental conditions, as well as present conditions and/or projected conditions. The environmental conditions may include wind speed, wind direction, air temperature, air pressure, humidity, precipitation, cloud cover, season, length of daylight, tidal status, storage temperature, storage time, storage pressure, and day/night temperature differential.

The threshold can be, for example, a present supply, a future supply, a present demand, a future demand, an average market price, or a current market price. In some cases, the market factor may be a market price of electricity, a present market price of electricity, a future market price of electricity, a trending price of electricity, a supply of electricity, or a demand of electricity.

In one embodiment, the method further includes the step of delivering power to the grid to fulfill a power service. The delivering step may further include delivering power to the grid to fulfill a long-duration power service simultaneously with at least one ancillary power service. The power service may be baseload, intermediate, peaking, load following, frequency regulation, spinning reserve, non-spinning reserve, black start, reactive power control, load source on demand response, and/or ramp-rate control. In some embodiments, the delivering step further includes delivering power to the grid to fulfill the power service by simultaneously storing energy and routing energy. In other embodiments, the delivering step further includes delivering power to the grid to fulfill the power service by simultaneously generating energy and routing energy.

In further embodiments, the method includes the step of trading energy by initiating at least one of a purchase of electricity, an offer to purchase electricity, a sale of electricity, and an offer to sell electricity. The trading step may include fulfilling a power service by buying electricity at a market price, and selling electricity at a contract price.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings, wherein:

FIG. 2 is a table illustrating by example the technical parameters associated with an embodiment of the invention.

FIG. 3A is a table illustrating by example a baseline energy balance case according to an embodiment of the invention.

FIG. 3B is a table illustrating by example a high price/available supply case according to an embodiment of the invention.

FIG. 3C is a table illustrating by example a low price/available capacity case according to an embodiment of the invention.

FIG. 5 is a table illustrating by example fixed band trading parameters associated with an embodiment of the invention.

FIG. 9 is a table illustrating by example predictive trading parameters associated with an embodiment of the invention.

DETAILED DESCRIPTION

Figure 1:
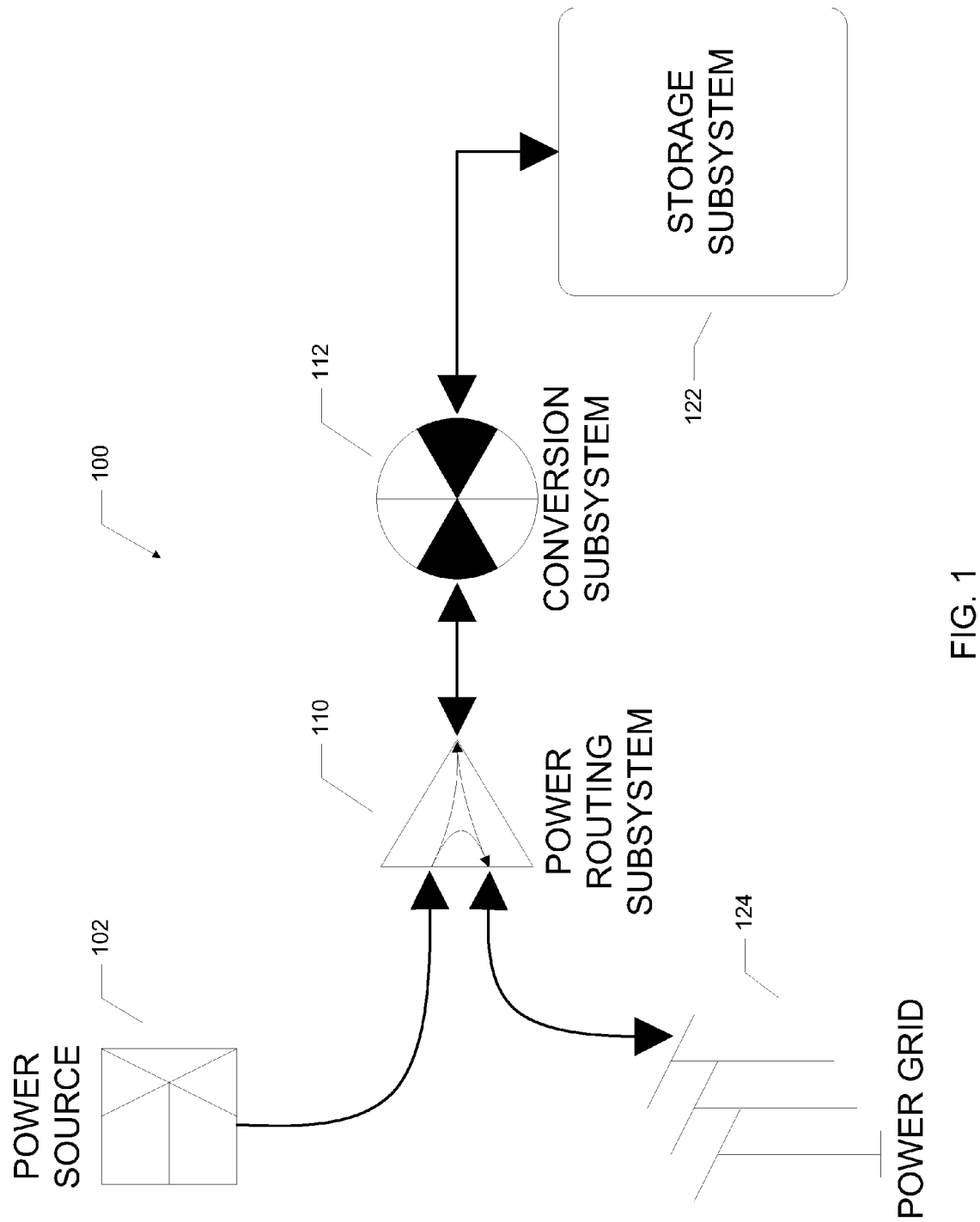
FIG. 1 is a system diagram illustrating by example an energy storage and delivery system according to an embodiment of the invention.

As background, FIG. 1 is an illustration of an embodiment of an energy storage and delivery system 100 in which an energy conversion subsystem (e.g., a compressor/expander device) may be used to both store energy and release energy that has previously been stored.

An exemplary gas compression and expansion system usable for practicing the present inventive subject matter is described in U.S. patent application Ser. No. 12/977,724, filed Dec. 23, 2010 (now U.S. Patent Publication No. 2011/0258996 A1), the entirety of which is hereby incorporated by reference.

A system such as that shown in FIG. 1 and described herein is available from General Compression, of Newton, Mass., under the name General Compression Advanced Energy Storage (GCAES™). The embodiment of the invention described herein incorporates the GCAES system. A person having skill in the art should appreciate, however, that the invention may utilize any energy conversion system suitable to practice the inventive subject matter herein described. The system may be capable of transferring and converting electric power or any other form of power with which the system may be compatible, such as hydraulic power.

As shown in FIG. 1, a power source 102 (e.g., a wind farm including a plurality of wind turbines) may be used to harvest and convert wind or other types of energy to electric power for delivery to a power routing subsystem 110 and conversion subsystem 112. It is to be appreciated that the system 100 may be used with electric sources other than wind farms, such as, for example, with the electric power grid, or solar power sources. In some embodiments, the power source 102 is collocated with the GCAES system. It should be noted, however, that the power source 102 may be distant from the GCAES system, with power generated by the power source 102 being directed to the GCAES system via a power grid or other means of transmission. The power routing subsystem 110 directs electrical power from the power source 102 to the power grid 124 or conversion subsystem 112, as well as between the power grid 124 and the conversion subsystem 112.

The conversion subsystem 112 converts the input electrical power from the wind turbines or other sources into compressed gas, which can be expanded by the conversion subsystem 112 at a later time period to access the energy previously stored. The conversion subsystem 112 may include an interconnected (in series or parallel) motor/generator, hydraulic pump/motor, hydraulic actuator and compressor/expander to assist in the energy conversion process. At a subsequent time, for example, when there is a relatively high demand for power on the power grid, or when power prices are high, compressed gas may be communicated from the storage subsystem 122 and expanded through a compressor/expander device in the conversion subsystem 112. Expansion of the compressed gas drives a generator to produce electric power for delivery to the power grid 124. In some embodiments, multiple conversion systems may operate in parallel to allow the GCAES system to convert larger amounts of energy over fixed periods of time.

The GCAES system is able to interface with very large storage containers, such as subterranean caverns, which are able to hold energy sufficient to supply hundreds of hours of power at commercially viable levels. Having the ability to access 5 to 300 hours of power from storage allows the formation of long-term power contracts (e.g., a 20- to 25-year baseload contract) which are otherwise not possible when supplying power with intermittent power sources in conjunction with significantly smaller storage tanks. Further, a GCAES unit is able to switch between generation/idle/storage modes on the order of milliseconds to seconds (compared to minutes, hours, or even days with other types of energy generation systems), which allows a GCAES energy provider to provide ancillary services such as frequency regulation at a moment's notice. Further, in some instances, the ancillary services may be provided simultaneously with the fulfillment of a long-duration power service or other short-term or ancillary services. If necessary, one or more individual GCAES units may be activated or deactivated to meet current demand, to trade energy on a power market, or to store energy for later use.

Conversely, some types of energy generation systems, such as gas plants, if operating optimally, are able to go up and down numerous times over a day, although this will result in additional wear on the plants' turbines. Such activity may be intended with peaker plants, which must operate at a higher rate during peak power usage hours. Power plant turbines, however, are substantially worn by frequent cycling; that is, there is deterioration caused by the turbine fins growing and shrinking from heating and cooling during spin-up and spin-down. It is therefore necessary to provide sufficient time between cycling to avoid damage that may occur from rapid changes in temperature.

Other examples of less flexible energy producers include coal plants, which can take several days to shut down and turn back on, and nuclear plants, which can shut down quickly, but may require days to come back online. The common thread of cycling limitation among these power plants is all related to thermal limitations. The GCAES system, however, does not encounter such thermal issues to any similar degree, and can cycle many times over a single day.

The above-described abilities of the system as well as the independence from many of the fuel pricing, regulatory, environmental, and global event risks that accompany other types of power generation (e.g., coal, nuclear) allow GCAES plants to enter into contracts to provide long-duration power services, such as long-term peaking contracts (e.g., sell power 8 hours a day, 5 days a week), intermediate contracts (e.g., sell power at all hours except off-peak hours (5 to 7 days a week, 16 hours)), and baseload contracts (e.g., sell power 7 days a week, 24 hours a day). The GCAES system also allows for a long-duration load following contract, wherein the supplying of power may vary greatly depending on an energy consumer's needs.

The capabilities of a GCAES plant go beyond its unique ability to utilize intermittent and steady energy sources combined with GCAES units to provide long-duration power such as baseload, capacity, or intermediate power. For instance, the segmentation of the plant systems provides flexibility in supplying power via a plurality of subsystems, each capable of rapid-time response to a power need, independent of the other subsystems. To satisfy these various needs, GCAES plants may include, among other subsystems, multiple GCAES energy conversion units that may function independently of each other. Combined with a massive scale-capacity energy storage subsystem and the ability to draw power from various energy sources, the GCAES system joins high-speed response with longer duration of response compared to other energy storage and generation systems (e.g., flywheels, supercapacitors, and the like).

Notably, a GCAES plant is able to provide one or more of the full range of shorter duration ancillary services to the grid concurrently with the fulfillment of a long-duration power service. A GCAES plant may also provide only ancillary services, only long-duration power services, or any combination of the foregoing. With respect to the provision of ancillary services, the GCAES system enables enhanced amplitude of increases and decreases in the amount of power provided, as well as faster ramp rates up and down, and more frequent repeatability of up and down ramping, than is present in existing systems.

Ancillary services are means of providing electric power to the grid in ways that meet particular needs that are a function of unpredictable and stochastic aspects of the power market, e.g., unpredictable variations in demand as end-users vary their usage during the course of each day, and unpredictable variations in supply such as outages of generator units and variations in the amount of power supplied by intermittent sources. Ancillary services are often characterized as response and reserve. Such services are typically characterized in categories that proceed from shortest response timeframes to longer response timeframes. Currently it is customary to refer to three basic categories of response and reserve, or ancillary services, the nomenclature and metrics of which are partially variable depending on the region, country, or Regional Transmission Organization (RTO) in question, while sharing basic characteristics.

One type of ancillary service that a GCAES plant is able to provide, while simultaneously fulfilling a long-duration power service, is frequency response, sometimes called primary reserve. To provide this service, the GCAES plant reacts to momentary drops and increases in system frequency (e.g., variations from 60 Hz in United States or 50 Hz in European systems), increases or decreases the amount of power supplied to the grid within timeframes of seconds (or potentially fractions of a second), and maintains such response for a designated period of time, which may be as short as 30 seconds in some instances, or may be defined as a number of minutes.

GCAES plants are also capable of providing spinning reserves, sometimes called secondary reserves, which requires the plant to respond within a timeframe set by the duration of the primary reserve or frequency response. For example, if frequency response ancillary services are required by the RTO to provide a duration of at least 30 seconds, then secondary reserves or spinning reserves must be able to react within at most 30 seconds. An example in the United States is the California Independent System Operator (ISO), which requires spinning reserves to be able to increase power output within 60 seconds after the ISO determines that power from spinning reserves needs to be dispatched; the California ISO requires similar response times for non-spinning reserves to decrease power production or increase demand, requiring that the amount of additional load be at least 1 MW and capable of a duration of at least two hours. Utilizing its storage and generation capabilities, the GCAES system is able to meet various load and duration demands while fulfilling, for example, a baseload or intermediate contract at the same time.

Tertiary reserves include ancillary services denominated as replacement reserves, standing reserves, contingency reserves, response reserves, or synchronized reserves, and provide a response within the timeframe set by the duration of secondary reserves, which will typically be a timeframe defined in terms of minutes or one or two hours. Tertiary reserves must be maintainable for a long duration. GCAES plants are also capable of meeting these response and duration requirements for providing tertiary reserves.

In addition to providing ancillary services such as load following, frequency regulation, spinning reserve, non-spinning reserve, black start, and ramp-rate control, GCAES plants can provide reactive power control to assist in controlling voltage levels throughout an electrical system. GCAES plants can further provide load source on demand response, in which a source of energy is needed to absorb energy from a power grid, effectively acting as an energy sink. Under this circumstance, a GCAES plant could convert the energy and transfer it to storage for later use. The GCAES system can further provide ancillary services demand response to ensure proper operation of a transmission grid.

Providers of ancillary services must typically have a minimum rated generating capacity, such as 1 MW, and must typically satisfy standards for communication and control, such as ability to respond to ISO direction and control, including dispatch instructions, without human intermediation. Prospective providers of ancillary services typically are required to apply to the RTO/ISO for approval and certification to provide such services. In addition to ancillary services, RTO/ISOs establish and operate markets for baseload power on a day-ahead and longer term basis, as well as intermediate or following load power. GCAES plants meeting regional capacity and other requirements are able to take advantage of these ancillary service and long-duration power service markets.

If a power source is not meeting current needs (e.g., if the power source is a wind farm, and there is insufficient wind), a GCAES plant is still able to fulfill a baseload power purchase agreement by using the energy that is available from the power source, in combination with energy obtained from storage. If the storage capacity is sufficiently large, it may contain enough stored energy (e.g., compressed air) to fulfill baseload for an extended period of time in the above-described circumstances. In the case of smaller storage units, supplying energy via this combination of sources may not be feasible beyond a limited period; as such, energy trading may play a larger part in fulfilling the baseload contract.

Power generation using the GCAES system also negates the risk that the wrong type of power plant will be built. The overall system has at least three elemental aspects whose relative size may affect important power performance characteristics: the power source (e.g., wind turbines), cavern capacity, and the GCAES equipment. Each element may be sized to meet the energy needs of a customer; i.e., the number of wind turbines, GCAES units, or amount of cavern capacity can be adjusted to move with energy demand and/or the energy market.

For example, if a peaker plant is constructed with the capacity to ramp up and down, but later circumstances require additional baseload, then the wrong generator has been built and substantial capital expenditure has been wasted. Conversely, the GCAES system is flexible such that it isn't fixed as a baseload or peaker plant. If, initially, a GCAES plant is built to primarily supply baseload, but the need for peaking later arises, all that is required is to incorporate additional GCAES units and related equipment into the plant, and keep the wind turbines or other intermittent power source the same. Alternatively, if a GCAES peaker plant is built, and at a later time additional base capacity is required, no changes are made to the GCAES equipment, but more wind turbines may be added.

Various minimum, maximum, and typical values and ranges for the operation of GCAES plants and associated systems related to energy storage and delivery are described in FIG. 2. The power source connected to a GCAES plant may supply 1.5 MW to 2000 MW of power, with a typical supply being approximately 100 MW. The storage capacity, namely cavern capacity, utilized by the plant may be between 20 kcf and 4 bcf, with common ranges falling around 1 billion cubic feet. Gas compressed by the GCAES system is stored in the storage subsystem at 70 to 95 Bar, but pressures may range from approximately 20 to 200 Bar. GCAES units compress gas in two stages: in the first stage, gas is compressed to 1-7 Bar, while in the second, gas is compressed to 7-90. Expansion is also performed in a two-stage process at substantially similar pressures. The GCAES units may, however, compress gas at pressures ranging from 5 Bar to 200 Bar utilizing a process with a varying number of stages.

GCAES units have a rapid response rate when switching modes. Alternating between storage and generation modes can generally be accomplished in 0.25 to 4.2 seconds, with the switch occurring in as little as 50 ms in optimal conditions. Switching from an idle mode to either storage or generation can also be accomplished in approximately 0.25 to 4.2 seconds, with a floor of 50 ms for optimal conditions.

Power plant elements are sized with regard to the energy performance required to meet predictable customer demands. In addition, a GCAES plant's elements may also be sized to include additional capacity that allows the plant to participate in electricity market power-trading. Power plant element sizing may involve the relative sizing of, e.g., additional wind turbines or GCAES units or storage volume. Moreover, the need for additional equipment needed to participate in power-trading may be minimal, or even none, because the need may be considered with respect to the economic effects of weather and other factors that are forecast rather than deterministically known. Further, the need for additional equipment or storage capacity may recognize that the equipment that supports long-term power contract(s) can also support short-term power-trading, and therefore enable the operator to benefit from understanding short-term energy price, supply, and demand, with or without investing in power-trading dedicated equipment.

The power trading component incorporated in the GCAES system improves upon existing methods and systems for creating and clearing a market for electric power, by enabling wind-power and other intermittent renewable power sources to participate at full market value, with enhanced profit and return on investment, thus boosting the development of renewable energy in the competitive electric power markets of the United States and other regions of the world.

It should be noted that this system for GCAES-based power trading can be practiced in combination with a wind farm or other intermittent energy source, or solely utilizing power obtained from the grid, or a combination thereof; and can be practiced with or without a contract to supply long duration power. This system can be employed not only to reduce power output to the grid, but also to accept load from the grid. The GCAES system therefore is able to function simultaneously or separately in various modes; for example, the system can provide long-duration power services and/or ancillary power services, as well as engage in power trading to fulfill services and/or convert energy to/from storage. The GCAES system can operate in any one of these modes or any combination thereof. In some instances, the system may provide both long-duration and ancillary power services. In other circumstances, for example, the system may provide ancillary services while engaging in power trading.

As part of the power trading component, market conditions are analyzed in time increments, preferably very short increments, from 30 seconds to an hour, or any other suitable time period. If, during that increment, the market price of power is below a particular threshold, such as a historical average, daily average, 24-hour rolling average, or some other indicator, that power can be purchased, and idle GCAES equipment can be used to put the energy into storage. Further, if the market price is below the price of a baseload contract, the cheaper power can be used to fulfill the contract for that time increment. In other words, the power can be purchased at the low market price and sold at the contract price directly through market trading—no interaction with the GCAES conversion system is necessary. Along the same lines, if the market price of power is above a particular threshold, and the GCAES equipment is not currently in use to supply power for the firm power contract(s), the GCAES plant can release energy from storage and supply it to the grid at the market price.

In some embodiments, one or more market factors may be used in making trading decisions, such as whether to buy or offer to buy power, and whether to sell or offer to sell power, as well how much power and at what price. The market factor may be, for example, a past market price of power, present market price of power, future market price of power, trending price of power, average price of power defined over a fixed timeframe, average price of power defined over a variable timeframe, supply of power, demand of power, supply trend, demand trend, or any historical or predictive value of the foregoing. The market factor may include a single value, multiple values, and/or ranges of values.

In a more specific example, if a GCAES plant with 200 MW of wind turbines has obligations to supply power under a 100 Megawatt intermediate contract at $70 per Megawatt-hour, and the wind is blowing at half-power during off-peak hours, there are several possible actions that can be taken depending on market conditions. If, for instance, power spot prices are well below the average price and the contract price (e.g., the spot price is $5/MW·h), and not all GCAES units in the plant are being utilized, then it is advantageous to purchase power and compress to storage, to the full extent of available GCAES equipment and storage capacity, for that time increment. In the opposite example, if it is daytime (when power must be supplied under contract), the wind turbines are producing 200 MW, and the price of power on the spot market is $200/MW·h, then the plant can take advantage of these conditions in numerous ways. First, 100 MW has to be supplied under contract at $70/MW·h. If possible, the extra 100 MW from the wind turbines can then be sold on the spot market for $200/MW·h (i.e., the extra 100 MW is routed from the wind turbines to the grid, bypassing the GCAES conversion and storage equipment). Going even further, because the GCAES units will likely be idle (no compression is necessary), the units can be put into expansion mode to sell stored energy for that time increment. That is, if 100 MW of stored energy was initially purchased at $5/MW·h, it can then be sold at the $200 spot market price. In these conditions, therefore, a GCAES plant set up to satisfy a 100 MW supply contract can actually supply 300 MW, with potentially substantial profit derived from supplying the extra 200 MW.

Referring to FIGS. 3A-3C, the tables represent examples of how energy from a power source and storage may be combined with trading to satisfy a baseload contract. The "Power Source (MW)" column indicates how much power is received from the power source per time unit, in MW. The "GCAES (MW)" column indicates how much power is transmitted through the GCAES unit per time unit, in MW, with a positive number designating expansion of energy from storage, and a negative number designating compression of energy to storage. The "Grid (MW)" column indicates how much power is transmitted to the grid per time unit, in MW. In each of FIGS. 3A-3C, the following exemplary limitations are assumed. First, desired output to the grid is at least 100 MW, to fulfill a 100 MW baseload contract. Second, the GCAES plant is capable of converting a maximum of 100 MW per time unit.

FIG. 3A describes an exemplary baseline energy balance case in which no trading is used to satisfy the baseload contract. In the first row, high wind conditions result in excess power output of 100 MW, which is converted by the GCAES system into compressed gas storage. The remaining 100 MW is supplied directly to the grid, avoiding any efficiency losses associated with the energy storage system. The second row shows the case in which the power source exactly meets the baseload requirement; thus, the full 100 MW is directed from the power source to the grid. The third row displays the situation in which the power source is supplying no energy, and the full 100 MW is expanded from stored gas by the GCAES unit.

FIG. 3B expands upon the baseline case by factoring in energy-selling when market prices surpass a threshold above the average. In this case, it is advantageous to retrieve stored energy and supply it to the grid. As such, the GCAES equipment will provide its maximum of 100 MW in combination with the amount of power that is received from the power source. Thus, for each wind intensity, the total power supplied to the grid is the amount received from the power source plus 100 MW.

Referring to FIG. 3C, when market prices fall under a threshold that is below the average, it becomes desirable to purchase and store energy for later sale when market prices rise. As shown on the table, the GCAES equipment will compress and store a maximum of 100 MW. In the high-wind case, 100 MW is supplied to the grid to meet the baseload contract, and 100 MW is stored. In the average-wind case, the 100 MW from the power source can be used to fulfill the baseload contract, or it can be converted to storage. If stored, the baseload contract can be fulfilled by buying power from the market at the lower price and selling at the higher, contracted price. If used to directly fulfill the contract, then 100 MW will be purchased at the low price and converted to storage. In the case where no wind is blowing, the table shows that 200 MW of energy is purchased at the low market price: 100 MW is supplied under the baseload contract, and 100 MW is converted to storage. It should be noted that in certain circumstances, it may be preferable to satisfy the baseload contract partially or entirely through expansion of stored energy; however, that situation is not addressed in FIG. 3C. Further, power purchasing alone can be used to satisfy a baseload contract.

In other cases, market prices, equipment availability, overhead costs, and other factors may cause variations in these values. For example, certain circumstances may result in a situation where it is desirable to provide power to the grid from any combination of the power source, storage, and energy market sales. Similarly, energy for storage can be obtained by any combination of the power source and energy market purchases.

It should be noted that the tables provided in FIGS. 3A-3C are examples of the basic operation of the inventive subject matter, and, as such, the values used are for purposes of illustration and may not reflect actual values existing in the system. Further, the situations described may be oversimplified to illustrate basic concepts of the system and therefore do not represent all possible circumstances, results, and considerations that may be taken into account when operating the system.

At its core, the trading aspect of the system comprises three trading rules to address three issues: First, when should energy be traded? Second, how much energy should be traded? And third, how does storage affect trading?

Rule number one states that power should be bought or sold when it is incrementally profitable to do so. For example, if "profitable" is defined in relation to an average price of power, whether for an hour, a day, a rolling 24-hour period, a week, a month, a year, or some other time period, then power will be bought when the spot market price (or other market factor) is less than the average price by a threshold amount. Likewise, power will be sold when the spot market price (or other market factor) is greater than the average price by a threshold amount. The buy threshold amount may or may not be the same as the sell threshold amount.

Some embodiments of the trading systems and methods described herein do not require any predictions about market or environmental conditions to be made to accomplish the goal of the invention. In some cases, an energy trade is made if it is incrementally profitable at the present time, and no waiting occurs to determine if a later time increment may be more or less profitable. In an exemplary estimation, to be incrementally profitable, power must be purchased at 20% below the average market price. This percentage is derived primarily from the efficiency loss of the GCAES device, which is about 86 to 87% efficient in compression mode, plus the operating costs of the equipment, which may vary, but for purposes of illustration is $2.50/MW·h. In addition, trading costs must be factored into the equation. To sell power profitably, it must be sold at a similar rate above the average price, or 20% as herein described. These percentage thresholds may vary depending on equipment efficiency, operating costs, trading costs, and other factors.

Certain trading costs that may be factored into the calculation of the buy and sell thresholds include power price modifications made by electricity spot market controllers. One example of such controllers are Regional Transmission Organizations (RTOs), which are the primary spot markets for electricity in the U.S. and many other parts of the world. The RTO spot market process is based on generators of electricity supplying an offer price, and on loads (the distributors of electric power to end-users) offering a bid price, to buy electricity. The offers and bids are placed, for example, every five minutes with the RTO. Subsequently, the RTO sets a price and sends instructions (dispatch) to the generators specifying how much electricity they are to supply to the grid and the price they will be paid for the electricity. The spot market prices (called Location Marginal Pricing or LMP) are set based on the bids and offers, reserve requirements, transmission congestion, location of the demand and supply and a number of other factors. The RTO has the authority to change the offers from the generators and use the changed offering in calculating the LMP. Often, the generator does not have the ability to reject the price specified by the RTO or to decide how much electricity or reserve will be supplied to the grid. Taking all this into account, the system may consider the RTO's abilities to set electricity prices, as well as the existence of other bids and offers, demand and supplies, and other factors relating to the calculation of the LMP, in making bids and offers to a spot market controller. The foregoing factors may further be considered by the GCAES system in determining how much power to buy or sell, or offer to buy or sell, as well as how much energy to store or retrieve from storage.

Figure 4A:
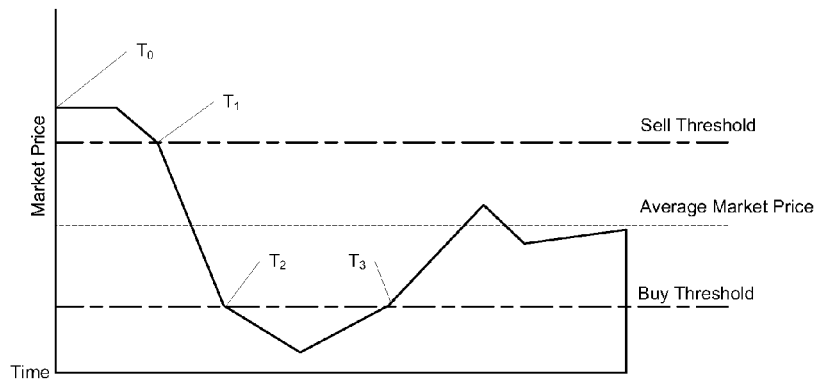
FIG. 4A is a chart illustrating by example a baseline energy market case according to an embodiment of the invention.

Referring to FIG. 4A, an exemplary graph shows the market price of electricity over time. The average market price is represented as a uniformly-dashed line, with the sell threshold being some amount above the average market price (e.g., 20% above), and the buy threshold being the same or a different amount below the average market price (e.g., 20% below). Based on the market price over time, power will be sold between times $T_0$ and $T_1$, when the price is above the sell threshold (assuming storage supply exists). Likewise, power will be purchased between times $T_2$ and $T_3$, when the price is below the buy threshold (assuming storage capacity exists).

Rule number two specifies that the full capacity available in that time trading period should be bought or sold; however, this amount may vary based on other conditions. The amount of energy that can be processed during the time increment is dependent on the availability and capability of a plant's GCAES equipment. Without looking ahead to later time increments, the full power capacity capable of being processed by the GCAES units is traded, preferably without regard to energy storage. Comparing the power plant to a car, the GCAES units can be considered the engine, and the storage as the gas tank. Under Rule Two, the primary concern is how much the engine can be utilized over the next time increment, without regard to the contents of the gas tank.

Rule number three indicates that available storage capacity should be taken into account when making trading decisions. With regard to the exemplary 20% above-20% below average price band discussed above, this 40% pricing band should be slid up and down depending on how full storage is. In some cases, both band boundaries slide at an equivalent rate, while in other cases, the boundaries may move independently. As an example, if the energy storage vessel is 95% full, the trading model should represent one in which selling is preferable over buying. To that effect, for the time increment during which storage capacity is at this 95% level, the 40% pricing band should be moved down such that power will be sold closer to the average price, at the average price, or even below the average price, in order to avoid filling or over-filling the storage tank. At the other end of the band, power will not be purchased unless it is far below the average price, e.g., about 40% below or lower. Conversely, when the storage tank approaches empty, the pricing band is shifted up so that buying power is preferable over selling. For example, rather than buying/selling at 20% below/above the average, power purchases will be made at 10% below the average and sold at 30% above. Using this method of trading, the system is freed from having to predict future environmental or marketing conditions and the risks inherent therewith.

Figure 4B:
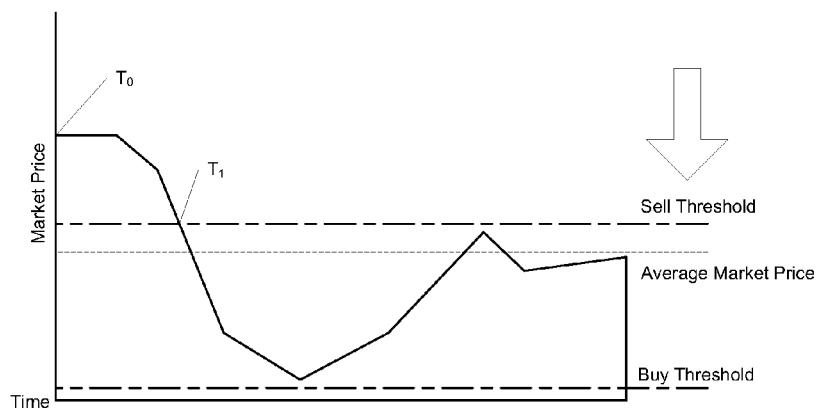
FIG. 4B is a chart illustrating by example a low capacity storage case according to an embodiment of the invention.
Figure 4C:
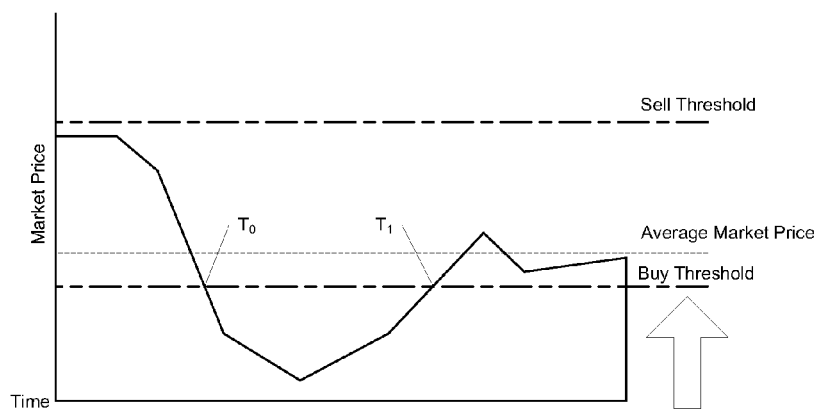
FIG. 4C is a chart illustrating by example a high capacity storage case according to an embodiment of the invention.

Referring to FIG. 4B, as storage approaches full, the sell/buy thresholds slide downward, causing power to be sold at lower prices (i.e., between $T_0$ and $T_1$), and purchased at lower prices than those in the FIG. 4A baseline case, assuming the average market price is constant among FIGS. 4A-C. As shown in FIG. 4B, the buy threshold has dropped below the lowest market price, resulting in no power purchases.

Conversely, in FIG. 4C, as storage approaches empty, the sell/buy thresholds shift upward, causing power to be sold at higher prices, and purchased at higher prices (i.e., between $T_0$ and $T_1$) than those in the FIG. 4A baseline case, assuming the average market price is constant among FIGS. 4A-C. As shown in FIG. 4C, the sell threshold has risen above the highest market price, resulting in no power sales.

In some embodiments a fourth rule is included, which states that the availability rating required in a power purchase agreement (PPA) may be altered to produce more favorable trading outcomes. The availability rating in a PPA is the percentage of time that the system is available to generate power. For example, nuclear plants and coal plants generally have a 90% availability, with nuclear slightly higher and coal slightly lower. To avoid inconveniencing customers, these plants will perform servicing mostly in the spring and fall, when loads are lowest. GCAES plants are modular and do not normally require the entire plant to be brought down for servicing. Further, some GCAES plants may have extra GCAES units installed, thus allowing for the swapping in and out of units for maintenance, resulting in no noticeable effect on the plant's capacity to generate power.

There are at least two separate ways in which a PPA can be incorporated into trading logic. First, trading may be used to avoid failure in meeting a PPA. For instance, if there is insufficient power being generated from the intermittent power source over a long period of time, then the trading algorithm will ensure that power is purchased to fill the storage tanks, and availability under the PPA will subsequently rise. Conversely, if the power source is supplying an overabundance of energy, and storage is nearly full, the trading algorithm will shift the pricing band as necessary so that more power is sold. By selling the power and maintaining sufficient storage capacity, excess energy is not wasted, and the PPA can be satisfied at later dates, even if the source of power decreases in its generation capacity.

The second way in which a PPA and energy trading interact involves trading around the PPA. For purposes of illustration, consider a GCAES plant having a baseload contract at $70/MW·h, with a 90% availability requirement. In one example, if gas prices rise, causing spot and peaking power prices to go up to $110/MW·h, a trader will be incented to meet the 90% availability target at $70/MW·h, and sell the remaining available power output at $110/MW·h. More generally, if power prices are high, it is desirable to meet only the minimum availability requirements under a PPA. If, on the other hand, gas prices fall drastically, causing spot and peaking prices to decrease to $40/MW·h, it may be preferable to exceed the required minimum availability under the PPA (i.e., sell under the contract at $70/MW·h), especially if market prices are not expected to rise to the PPA contract price. Thus, this second method allows flexibility in meeting availability under a PPA in response to market conditions, while at the same time ensuring the fulfillment of long-term power supply contracts.

Various minimum, maximum, and typical values and ranges for the above-described fixed-band energy trading systems and methods are described in FIG. 5. In a typical scenario, the sell and buy margins are set at predetermined amounts above and below an average market price of electricity, or other factor. Based on the amount of storage capacity available, the margins may be shifted up or down by a certain amount. The full capability of energy storage or generation of the GCAES plant, GCAES unit or units (or other amount of energy) is traded per a set time interval when the current market price, or other factor, falls outside of the sell/buy margins.

Figure 6:
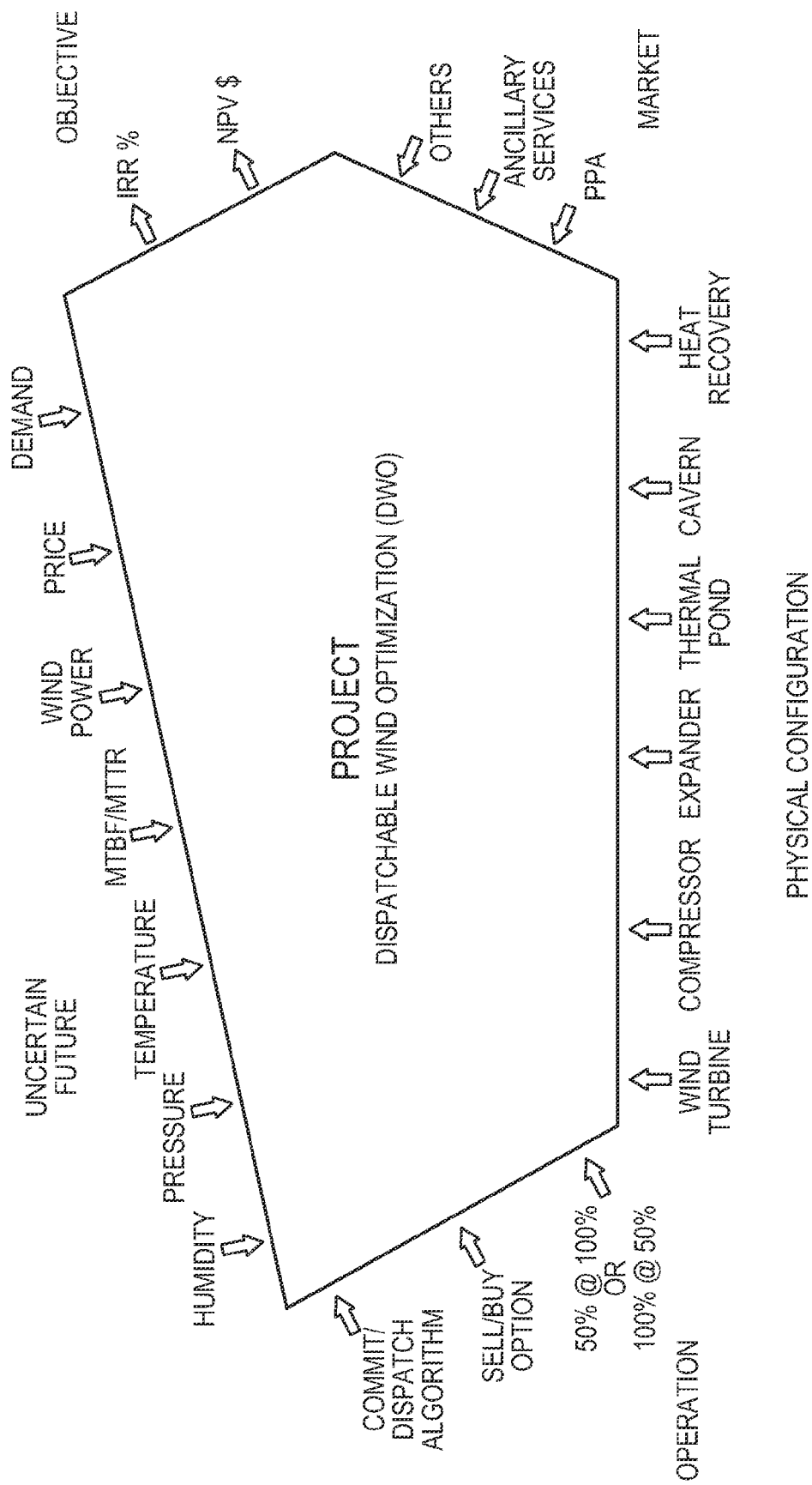
FIG. 6 is a model diagram illustrating by example an optimization model according to an embodiment of the invention.

In some embodiments, predictive elements are incorporated into the determination of whether to buy/sell and compress/expand energy. Referring to FIG. 6, an optimization model may use, for example, environmental forecasts (e.g., expected wind power, temperature, pressure, humidity), market conditions predictions (e.g., future price, demand), or other future factors in optimizing energy storage and delivery. Considering the available inputs as a whole, the optimization model determines the most advantageous configuration in different categories to maximize internal rate of return (IRR) and long-term net present value (NPV).

Aside from the predictive aspects, the three main categories preferably considered in the optimization model are the physical configuration of a project, the different approaches for operation of the project, and the market participation. The model evaluates the physical capabilities of a plant, which may include, for example, the size and number of wind turbines, the capabilities of the GCAES units available, the size of the storage cavern, and the ability to recapture heat. Examples of operation optimization include a dispatch algorithm, discussed in further detail below, and deciding, for example, whether to run 50% of the GCAES units at 100% capacity or 100% of units at 50% capacity. In the last category, the model decides, based on the specific region, how and in which potential markets the plant should participate.

Figure 7:
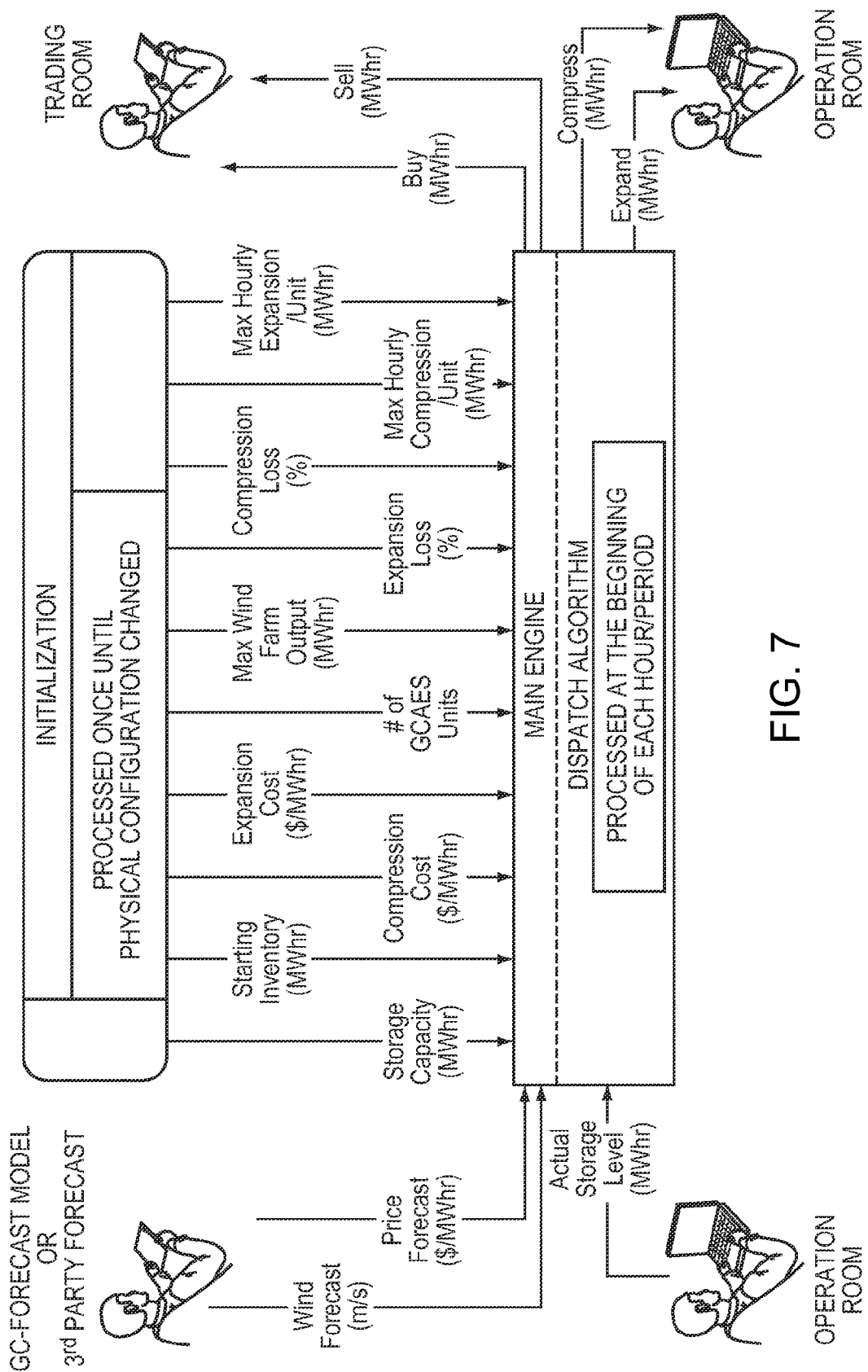
FIG. 7 is a diagram illustrating by example the inputs and outputs to a dispatch algorithm according to an embodiment of the invention.

FIG. 7 is an exemplary diagram of the inputs that may be incorporated into the dispatch algorithm, as well as the possible outputs thereof. The dispatch algorithm may be a module of the optimization system used to optimize the energy dispatch operation of the plant. First, the algorithm is initialized using a set of configuration parameters (e.g., storage capacity, starting inventory, compression cost, expansion cost, number of GCAES units, maximum wind farm output, percentage expansion loss, percentage compression loss, maximum hourly compression per unit, maximum hourly expansion per unit). Following initialization, at the beginning of a time interval based on the region (e.g., five minutes, thirty minutes, one hour, or any other period based on the regional market), the algorithm considers the actual storage level, forecasted price, and wind data, for a predictive time period (e.g., 24 hours, 168 hours, or any suitable time period), and runs the optimization methodology to come up with the optimal solution for both the operation room and the trading room for the current time interval. Specifically, the algorithm outputs the amount of energy that should be compressed or expanded, as well as how much power should be bought or sold during the interval to maximize total revenue. This process or portions thereof may be repeated at the beginning of each time interval to maximize revenue while satisfying the constraints such as keeping the storage level within its minimum and maximum capacity at all times.

Figure 8:
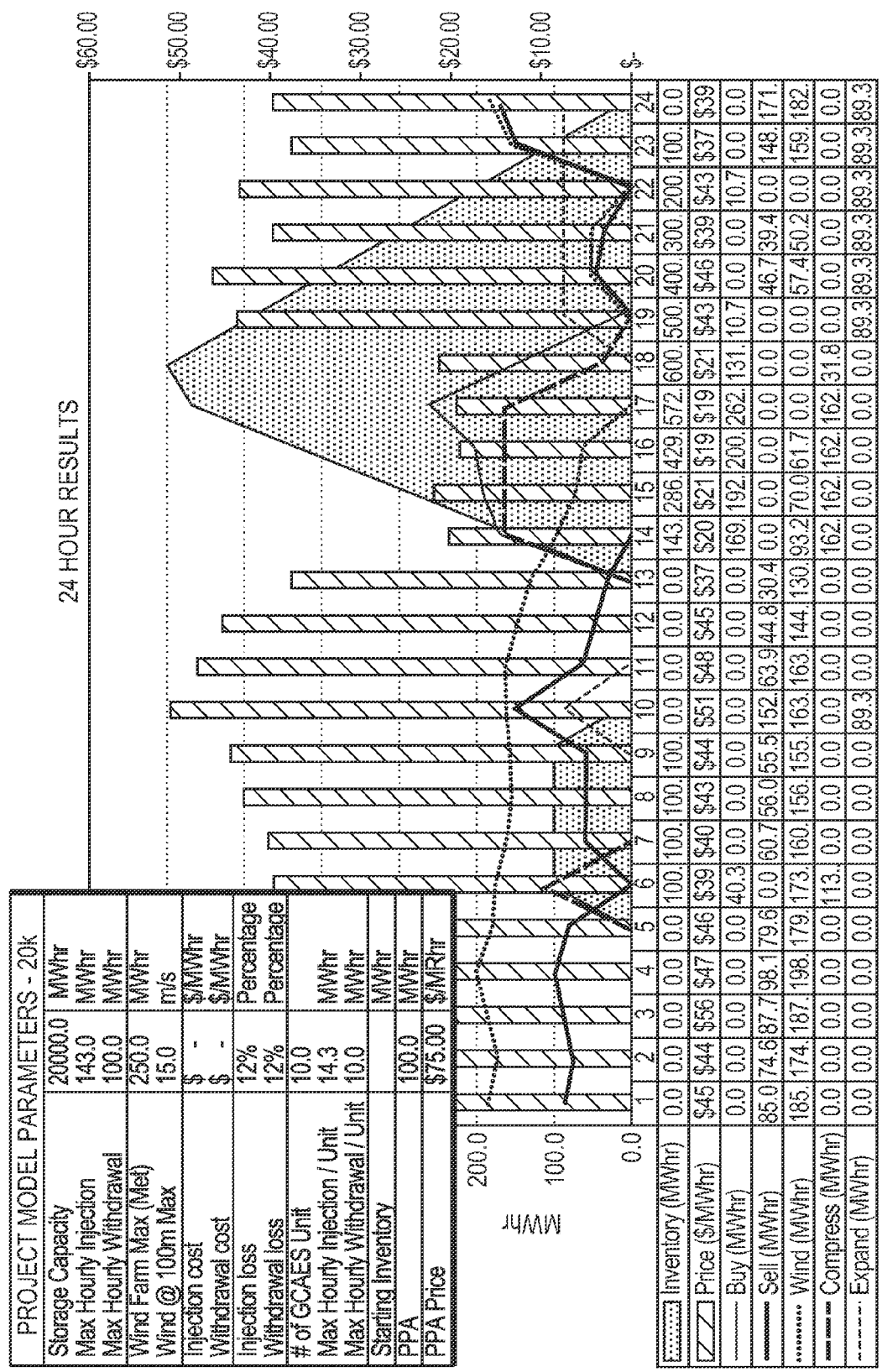
FIG. 8 is a graph illustrating by example a visual representation of a dispatch algorithm output according to an embodiment of the invention.

Referring to FIG. 8, a sample result of running the optimization system and its accompanying algorithmic modules is shown over a 24-hour period, with time intervals of one hour. The graph illustrates the satisfaction of a 100 MW·h power purchase agreement, while simultaneously maximizing revenue by buying at lower prices and selling at higher prices. The algorithm considers both the price and wind factors to decide how much to compress/expand and buy/sell at a given time.

Various minimum, maximum, and typical values and ranges for the above-described predictive energy trading systems and methods are described in FIG. 9. In evaluating whether energy is to be stored, generated, and/or traded, the system may account for current contract prices (e.g., baseload or other long-duration, or ancillary service contract), the market price of energy (past, present and/or future), the supply and/or demand of electricity (past, present, and/or future), and various past, present or future environmental conditions, including but not limited to wind speed, wind direction, air temperature, air pressure, humidity, precipitation, cloud cover, season, length of daylight, tidal status, storage temperature, storage time, storage pressure, and day/night temperature differential.

In some embodiments, the invention incorporates one or more computer controller devices for facilitating various operations of the system. For example, computing devices may facilitate the operation of power routing subsystems and power conversion subsystems separately or in combination with each other or a number of other subsystems. Instructions may be implemented on the computing devices such that the power routing subsystem is automatically directed to transfer energy from a power source to a power grid. Further, the computing devices may include instructions for automatically directing the conversion subsystem to store or generate power. The computing devices may direct these subsystems to operate such that power is both directed to the grid and either converted to or from storage simultaneously. Moreover, any number of inputs may be considered by the computing devices in determining how the system and its various subcomponents should operate. For example, the computing devices may evaluate the current operating conditions of a GCAES plant, storage capacity, present, past and/or environmental conditions, market conditions, and make determinations on how the system should operate to meet present and future power demands.

Figure 10:
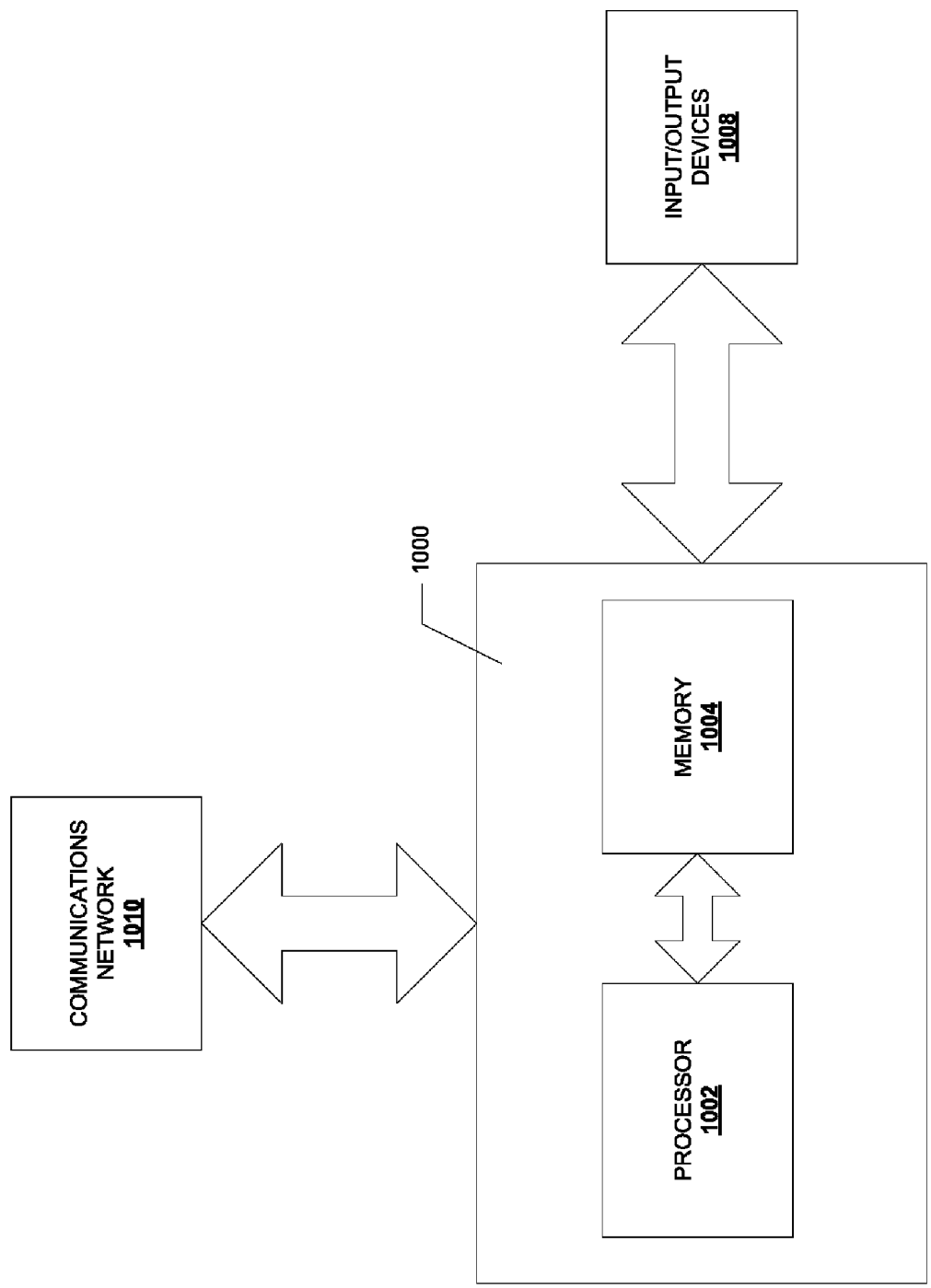
FIG. 10 is a block diagram illustrating by example a computer system according to an embodiment of the invention.

The computer controller may be implemented on such hardware as a smart or dumb terminal, network computer, workstation, minicomputer, mainframe computer, or other computing device that is operated as a general purpose computer or a special purpose hardware device. Referring to FIG. 10, the controller may include a computing device in the form of a computer 1000 including a processing unit 1002, a system memory 1004, input and output devices 1008, and a system bus that couples various system components including the system memory to the processing unit.

In some embodiments, the controller includes controller software for automatically directing the operation of the system and/or permitting a user to interface with the system and its various subcomponents. The controller software may be in the form of a standalone application, implemented in a multi-platform language/framework such as Java, .Net, Objective C, or in native processor executable code. Any suitable programming language may be used in accordance with the various embodiments of the invention. Illustratively, a programming language used may include assembly language, Ada, APL, Basic, C, C++, C#, Objective C, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In one embodiment, a communications network 1010 connects the computer 1000 with other systems and devices, such as remote system controllers and power market servers. The communication may take place via any media such as standard telephone lines, LAN or WAN links (e.g., T1, T3, 56 kb, X.25), broadband connections (ISDN, Frame Relay, ATM), wireless links (802.11, bluetooth, GSM, CDMA, etc.), and so on. The type of network is not a limitation, however, and any suitable network may be used. Non-limiting examples of networks that can serve as or be part of the communications network 1010 include a wireless or wired Ethernet-based intranet, a local or wide-area network (LAN or WAN), and/or the global communications network known as the Internet, which may accommodate many different communications media and protocols. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, to the network via wireless or wired Ethernet, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the operation of the system. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer 1000 through a user interface that includes input devices 1008 such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices 1008, which may be connected through an output peripheral interface. The computers implementing the invention may operate in a networked environment using logical connections to one or more remote computers, the remote computers typically including many or all of the elements described above.

Although internal components of the computer are not shown, those of ordinary skill in the art will appreciate that such components and the interconnections are well known. Accordingly, additional details concerning the internal construction of the computer need not be disclosed in connection with the present invention.

The foregoing discussion discloses and describes merely exemplary embodiments of the present invention. As will be understood by those skilled in the art, the present invention may be embodied in other specific forms without departing from the spirit or essential characteristics thereof. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

The invention claimed is:

1. A system for encouraging the use of renewable energy sources and suitable for the conservation of energy resources through the efficient management of energy storage and delivery, the system comprising:
   a connection to a power source;
   a connection to an energy storage subsystem;
   a connection to a power grid;
   a power routing subsystem coupled to the power source and the power grid, and adapted to operate in a bypass mode, wherein energy is transferred from the power source to the power grid;
   a conversion subsystem coupled to the power routing subsystem and the storage subsystem, and switchable in substantially real-time between a storage mode, wherein energy is transferred from the power routing subsystem to the storage subsystem, and a generation mode, wherein energy is transferred from the storage subsystem to the power routing subsystem for delivery to the power grid;
   a trading subsystem for buying and selling power from and to a power trading market; and
   a control subsystem for directing, based at least in part on a market factor, the conversion subsystem and the power routing subsystem to operate simultaneously in the bypass mode and at least one of the storage and generation modes, and for directing the system to utilize power available from the power source, the storage subsystem, and the trading subsystem to fulfill contractual power service requirements.

2. The system of claim 1, wherein the power source is an intermittent power source selected from the group consisting of wind energy, solar energy, wave energy, tidal energy, falling water, hydro energy, biomass energy, and geothermal energy.

3. The system of claim 1, wherein the storage subsystem comprises a storage medium selected from the group consisting of fluidic storage, mechanical storage, kinetic storage, electrical storage, electrochemical storage, and thermal storage.

4. The system of claim 1, wherein the storage subsystem comprises a storage volume in a form selected from the group consisting of a pressure vessel, a subterranean cavern, a well, a flywheel, a battery, piping, a bladder, a hydrostatically pressure-compensated container, a lake, a pond, a liquid storage vessel, a water retention structure, and a capacitor.

5. The system of claim 1, wherein the conversion subsystem is adapted to convert energy to compressed gas, and comprises a motor/generator, a hydraulic pump/motor, a hydraulic actuator, and a compressor/expander connected in one of series or parallel.

6. The system of claim 1, wherein the directing by the control subsystem is further based on a comparison of the market factor to a threshold.

7. The system of claim 6, wherein the directing by the control subsystem is further based at least in part on an available capacity of the storage subsystem.

8. The system of claim 7, wherein the controller switches the conversion subsystem to operate in the storage mode when the market factor is less than the threshold by at least a predetermined margin and there exists available storage capacity.

9. The system of claim 8, wherein the predetermined margin is decreased when the available capacity is greater than a predetermined value, and wherein the predetermined margin is increased when the available capacity is less than a predetermined value.

10. The system of claim 7, wherein the controller directs the system to operate in at least one of the generation mode and the bypass mode when the market factor is greater than the threshold by at least a predetermined margin.

11. The system of claim 10, wherein the predetermined margin is increased when the available capacity is greater than a predetermined value, and wherein the predetermined margin is decreased when the available capacity is less than a predetermined value.

12. The system of claim 6, wherein the directing is further based at least in part on environmental conditions selected from the group consisting of present local environmental conditions, projected local environmental conditions, present local environmental conditions, and remote environmental conditions.

13. The system of claim 6, wherein the directing is further based at least in part on environmental conditions selected from the group consisting of wind speed, wind direction, air temperature, air pressure, humidity, precipitation, cloud cover, season, length of daylight, tidal status, storage temperature, storage time, storage pressure, and day/night temperature differential.

14. The system of claim 6, wherein the threshold is selected from the group consisting of a present supply, a future supply, a present demand, a future demand, an average market price, and a present market price.

15. The system of claim 1, wherein the market factor is selected from the group consisting of a market price of electricity, a present market price of electricity, a future market price of electricity, a trending price of electricity, a supply of electricity, and a demand of electricity.

16. The system of claim 1, wherein the controller further comprises a power delivery algorithm adapted to fulfill a power service selected from the group consisting of baseload, intermediate, peaking, load following, frequency regulation, spinning reserve, non-spinning reserve, black start, reactive power control, load source on demand response, and ramp-rate control.

17. The system of claim 16, wherein the power delivery algorithm is adapted to fulfill a long-duration power service simultaneously with at least one ancillary power service.

18. The system of claim 1, wherein the trading subsystem is further adapted for initiating at least one of a purchase of electricity, an offer to purchase electricity, a sale of electricity, and an offer to sell electricity.

19. The system of claim 18, wherein the trading subsystem is adapted to fulfill a power service by buying electricity at a market price, and selling electricity at a contract price.

* * * * *